United States Patent [19]
Fujihira et al.

[11] Patent Number: 5,654,131
[45] Date of Patent: Aug. 5, 1997

[54] OPTICAL MEMORY MEDIUM

[75] Inventors: Masamichi Fujihira, Yokohama; Hiroshi Muramatsu, Chiba; Norio Chiba, Chiba; Tatsuaki Ataka, Chiba, all of Japan

[73] Assignee: Seiko Instruments Inc., Japan

[21] Appl. No.: 595,097

[22] Filed: Feb. 1, 1996

Related U.S. Application Data

[62] Division of Ser. No. 324,741, Oct. 18, 1994, Pat. No. 5,513,168.

[30] Foreign Application Priority Data

Oct. 19, 1993 [JP] Japan ................................. 5-261286

[51] Int. Cl.⁶ ............................................. G11B 7/24
[52] U.S. Cl. ........................... 430/495.1; 430/270.11; 430/270.15; 430/945; 430/962; 365/106; 369/288
[58] Field of Search ..................... 430/270.11, 270.15, 430/495.1, 945, 962; 365/106; 369/272, 288

[56] References Cited

FOREIGN PATENT DOCUMENTS

| 0305033 | 3/1989 | European Pat. Off. |
| 61-037477 | 2/1986 | Japan ................. 430/270.15 |
| 61-180238 | 8/1986 | Japan ................. 430/270.15 |

Primary Examiner—John A. McPherson
Attorney, Agent, or Firm—Adams & Wilks

[57] ABSTRACT

There is provided an optical memory medium comprising a flat plate modified on the surface thereof by a photolytic residual group, an optical recording apparatus comprising an optical probe having a microscopic aperture on the leading end thereof, a light source, X-Y-Z position control means, and a controller for controlling the apparatus as whole and an apparatus for reading the optical memory medium comprising the optical memory medium, a friction detecting probe, an X-Y-Z position control means and a controller for controlling the apparatus as a whole. Further, information is written and read with high density less than the wavelength of light using an apparatus for writing to and reading from an optical memory piezoelectric medium comprising the optical memory piezoelectric medium constituted by a piezoelectric element modified on the surface thereof by a photolytic residual group, an optical probe having a microscopic aperture on the leading end thereof, a light source, an X-Y-Z position control means, a means for measuring the resonance characteristics of the piezoelectric element and a controller for controlling the apparatus as a whole.

15 Claims, 2 Drawing Sheets

OPTICAL MEMORY MEDIUM

This is a division of application Ser. No. 08/324,741 filed Oct. 18, 1994, U.S. Pat. No. 5,513,168.

BACKGROUND OF THE INVENTION

The present invention relates to an optical memory medium wherein high density recording is performed on the surface of a substrate through optically produced chemical changes on the surface of the substrate, to an optical recording apparatus having a microscopic aperture for performing optical recording with high density and to an apparatus for reading information from changes in the frictional force on the surface of the memory medium.

Conventional high density memory media include magnetic disks, optical disks, magneto-optical disks and the like. A magnetic disk is a flat plate applied with a magnetic substance and is written and read by a magnetic head. Since a magnetic disk is magnetized in a horizontal direction, there is a need for preventing magnetic fields from overlapping each other, which need has imposed a certain limit on efforts to obtain higher density. Optical disks and magneto-optical disks were developed in an attempt to allow recording with higher density. In the case of an optical disk, a raw disk is made by means of exposure to laser beams; a master disk is made by means of electroforming from the raw disk; and a replica disk is made by means of injection molding from the master disk. Reading is performed using variations in the reflectance of laser beams which depends on each bit. A magneto-optical disk is obtained by forming a thin film of a vertically magnetized material on a flat plate formed with pits for tracks. To perform writing on the magneto-optical disk, vertical magnetized spots are written into the disk by applying magnetic fields thereto in a vertical direction, with heating of spots irradiated by laser beams maintained above the Curie-point. Reading is performed by directing laser beams and utilizing changes in the polarization angle of the reflected laser beams which depend on the direction of the magnetization of the spots.

Laser beams are used to read bits in both of optical disks and magneto-optical disks which are high density optical memory media. The bit size is limited by the diameter of a spot to which a laser beam is converged and the minimum size is on the order of the wavelength of light, i.e., 1 μm.

SUMMARY OF THE INVENTION

It is an object of the present invention to provide a memory medium wherein the size of a memory bit is smaller than the wavelength of light and an apparatus for writing to and reading from the memory medium.

In order to achieve the above-described object, according to the present invention, there is provided an optical memory medium comprising a flat substrate modified on the surface thereof by a photolytic residual group. As an apparatus for optical writing on this optical memory medium, there is provided an apparatus comprising the optical memory medium, an optical probe having a microscopic aperture at the leading end thereof, a light source, an X-Y-Z position control means and a controller. Further, as a read apparatus, there is provided an apparatus comprising the optical memory medium, a friction detecting probe, and an X-Y-Z position control means and a controller.

In order to facilitate the detection of a frictional force, there is provided an optical memory piezoelectric medium comprising a piezoelectric substrate modified on the surface thereof by a photolytic residual group. As an apparatus for writing to and reading from this optical memory piezoelectric medium, there is provided an apparatus comprising this optical memory piezoelectric medium, an optical probe having a microscopic aperture at the leading end thereof, a light source, an X-Y-Z position control means, means for measuring the resonance characteristics of the piezoelectric element and a controller.

The optically reactive functional group can be provided with high density on the surface of the optical memory medium comprising a flat plate modified by a photolytic functional group. Therefore, the medium will have a unit memory area on the order of a molecule, i.e. a memory density equal to or less than 1 nm.

Among optically reactive functional groups, photolytic functional groups can be desorbed by irradiating the optical beam with a predetermined wavelength and therefore allows optical writing. Unlike conventional irradiation using optical beams, with the optical probe having a microscopic aperture, the area of irradiation can be focused to approximately 20 nm diameter, which allows high density recording.

The friction coefficient of the surface of the substrate varies depending whether there is an optically reactive functional group on the surface or not. It is therefore possible to read the information stored thereon by monitoring the variations in the friction. The frictional force can be detected by detecting the angle at which a cantilever of an atomic force microscope deviates in accordance with the friction at the surface.

When changes in the resonance characteristics of the piezoelectric plate are used as a means for detecting the frictional force, an optical memory medium obtained by modifying a piezoelectric plate in a shear vibration mode with a photolytic functional group is used. If the probe is brought into contact with the shear-vibrating piezoelectric plate, there will be a change in the resonance characteristics of the piezoelectric element. Since this change in characteristics depends on the friction coefficient of the surface, the information recorded thereon can be read by monitoring changes in the resonance characteristics of the piezoelectric element.

DETAILED DESCRIPTION OF THE PREFERRED EMBODIMENTS

An embodiment of the present invention will now be described with reference to the drawings.

(The Configuration of the Optical Memory Medium)

Figure 1A:
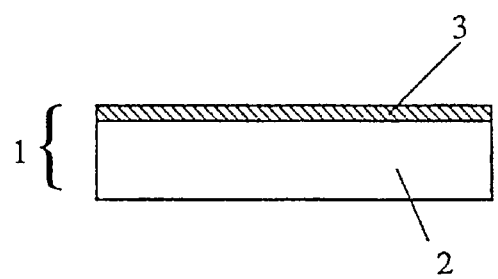
FIG. 1A is a side view of an optical memory medium according to the present invention.
Figure 1B:
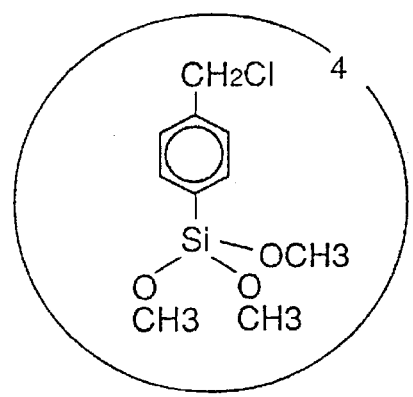
FIG. 1B illustrates the chemical formula of one example of a chemical modification substance according to the present invention.

FIG. 1 is a typical view of an optical memory medium 1 according to the present invention. In FIG. 1A, the optical memory medium 1 comprises a silicon substrate 2 and a film 3 chemically modified on the surface thereof. As the chemical modification substance, 4-(chloromethyl) phenyl trimethoxy silane (CMPTS) 4 as shown in FIG. 1B is used. The chemically modified film 3 is made by dipping a 10 mm square silicon substrate 2 which has been cleaned in advance into a 1% toluene solution of CMPTS at room temperature for 30 minutes.

(The Configuration of the Optical Recording Apparatus)

Figure 2:
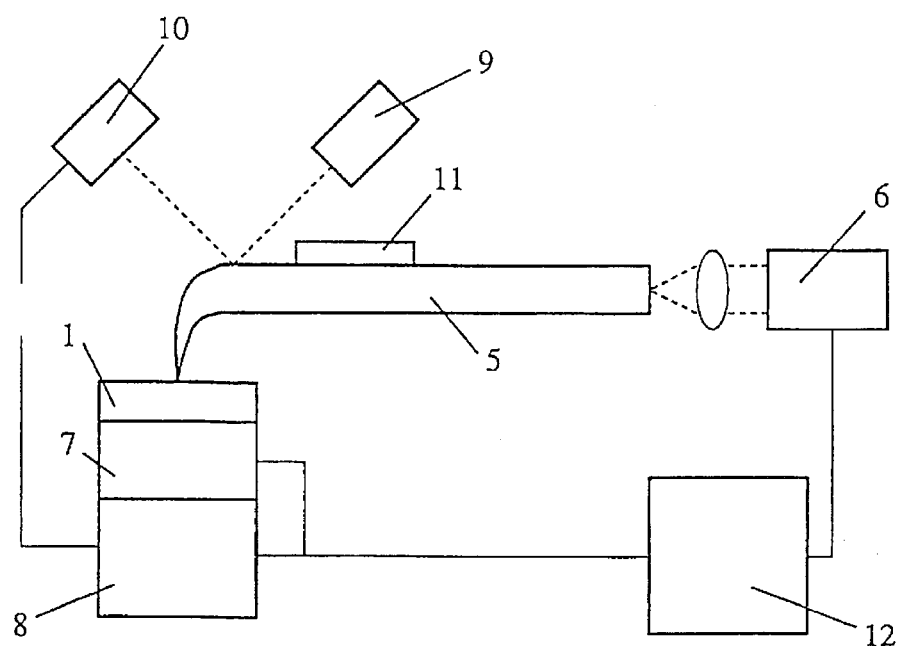
FIG. 2 is a side view of an optical recording apparatus according to the present invention.

FIG. 2 is a typical view of an optical recording apparatus according to the present invention. In FIG. 2, as an optical probe 5 having a microscopic aperture, an optical fiber sharpened at the leading edge thereof by means of laser beam heating and bent in the form of an "L" is used. The optical probe 5 is processed to be reflective by applying a metal film to the surface of the optical probe 5 excluding the leading end of a core portion. The leading end of the optical probe 5 is disposed proximate to the surface of the optical memory medium 1, and the other end face of the probe is connected to a mercury lamp 6 so that light is introduced to the optical probe 5 through a lens system. The X-Y-Z control mechanism is used for controlling the position of the optical probe 5 in the surface of the optical memory medium 1 and for controlling the distance between the leading end of the optical probe 5 and the optical memory medium 1. The X-Y-Z control means comprises an X-Y-Z fine adjustment mechanism 7 formed of a piezoelectric element, a coarse adjustment mechanism 8 comprising a stepping motor, a laser 9 and a two-piece photodiode 10 serving as an optical lever used for controlling the distance between the optical probe 5 and the optical memory medium 1.

A reflector for the optical lever is provided on the back surface opposite to the leading end of the optical probe 5 for allowing distance control through the detection of the deflection of the optical probe 5. A bimorph 11 may be connected to a portion where the optical fiber 5 is fixed to perform distance control utilizing changes in the amplitude of vibration caused in the vicinity of the resonance frequency by applying an AC voltage to the bimorph 11. Optical writing is performed with the light from the mercury lamp 6 turned on and off using a mechanical chopper to allow the writing of bit patterns of 20 nm in size. All of these operations are controlled by a computer 12 for controlling the apparatus as a whole.

(The Configuration of the Optical Read Apparatus)

Figure 3:
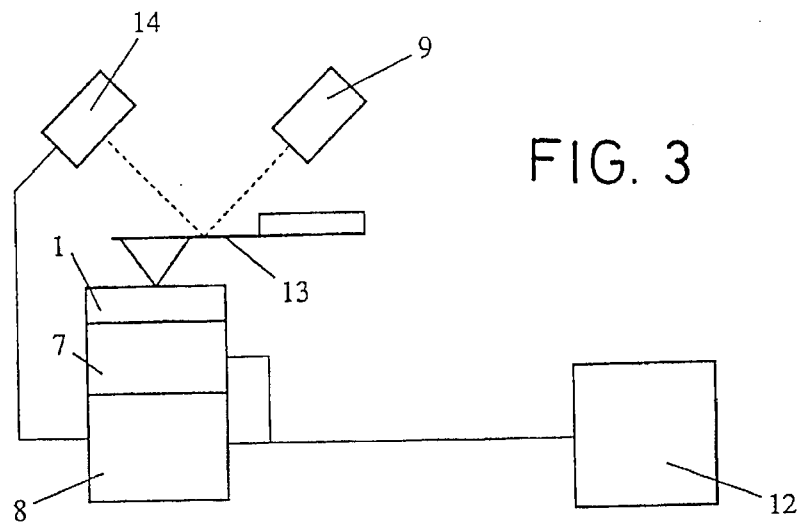
FIG. 3 is a side view of an optical write apparatus according to the present invention.

FIG. 3 is a typical view of an optical read apparatus according to the present invention. In FIG. 3, a cantilever made of silicon nitride having a microscopic projection at the leading end thereof is used as a friction detecting probe 13, the projection at the leading end of the friction detection probe 13 being positioned proximate to the surface of the optical memory medium 1. Like the recording apparatus, an X-Y-Z control mechanism is provided for controlling the position of the friction detecting probe 13 with respect to the surface of the optical memory medium 1 and for controlling the distance between the leading end of the friction detecting probe 13 and the optical medium 1. The X-Y-Z control means comprises an X-Y-Z fine adjustment mechanism 7 formed of a piezoelectric element, a coarse adjustment mechanism 8 comprising a stepping motor, a laser 9 and a four-piece photodiode 14 serving as an optical lever used for controlling the distance between the friction detecting probe 13 and the optical memory medium 1.

A reflector for the optical lever is provided on the back surface opposite to the leading end of the friction detecting probe 13, which performs distance control and the detection of torsion simultaneously by detecting the deflection of the friction detecting probe 13 and by detecting the torsion of the friction detecting probe 13 caused when the friction detecting probe 13 is scanned. These operations are all controlled by the computer 12 for controlling the apparatus as a whole. With this read apparatus, it is possible to clearly read the bits written through optical writing by means of the friction detecting probe 13. Although the bits could be read by controlling the distance of the friction detection probe 13 in the Z-direction, the method of friction detection for reading the memory bits is capable of much higher sensitivity.

(The Configuration of the Optical Recording Piezoelectric Medium)

Figure 4:
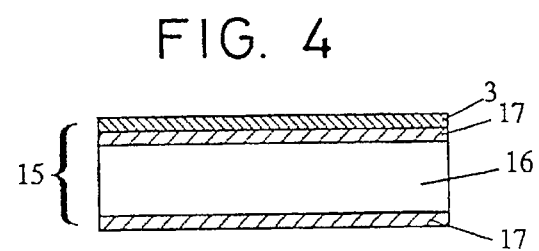
FIG. 4 is a side view of an optical memory piezoelectric medium according to the present invention.

FIG. 4 is a side or cross-sectional view of an optical recording piezoelectric medium 15 according to the present invention. The optical recording piezoelectric medium in FIG. 4 is an AT cut quartz plate 16 which is a piezoelectric element causing shear vibration. Electrodes 17 are formed by sputtering both sides of the AT cut quartz plate 16 using titanium as a backing layer and platinum. A film 3 which is chemically modified on the surface of the AT cut quartz plate 16 similar to that shown in FIG. 1A is provided on the surface of one of the electrodes 17.

(The Configuration of the Apparatus for Writing to and Reading from the Optical Memory Medium)

Figure 5:
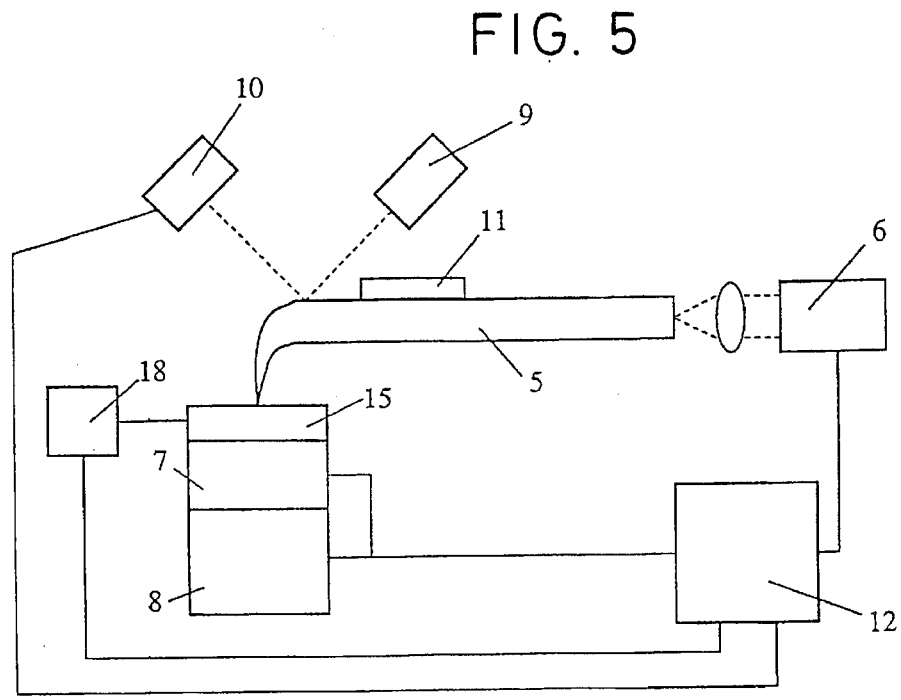
FIG. 5 is a side view of an apparatus for writing to and reading from an optical memory piezoelectric medium according to the present invention.

FIG. 5 is a typical side view of an apparatus for writing to and reading from an optical memory medium according to the present invention. The apparatus shown in FIG. 5 is obtained by replacing the optical memory medium 1 of the optical recording apparatus in FIG. 2 with an optical memory piezoelectric medium 15 and by adding a circuit 18 for measuring the characteristics of the piezoelectric medium 15. The circuit 18 for measuring the characteristics of the piezoelectric medium 15 measures changes in the admittance of the piezoelectric medium 15 by measuring the difference between the voltage at an oscillation circuit and the voltage across the piezoelectric medium 15 and exhibits a response speed on the order of 10 µm for the piezoelectric medium 15 having a resonance frequency on the order of 10 MHz. Further, with this circuit 18, the piezoelectric medium 15 can be caused to vibrate with a reference piezoelectric element, and changes in the characteristics of the piezoelectric medium 15 can be monitored by detecting changes in the resonance frequency of the piezoelectric medium 15 using a balanced mixer. This apparatus allows memory bits to be optically written and read.

The present invention can be implemented utilizing various photochemical reactions such as photooxidation, photoreduction, cis-trans photoisomerization, photochromic reactions in addition to the photolysis of CMPTS described in the above embodiment. The surface modification can be performed using various methods other than the silane-coupling process as described in the embodiment such as methods for making films including self-organizing films made of thiol compounds, Langmuir-Blodgett films made of amphipathic compounds and the like. In addition, the vapor deposition method, spin coat method and the like may be also used.

Memory erasing can be performed by applying light having a different wavelength as in cis-trans photoisomerization and reversible photochromic reactions or by thermally returning the medium to the initial state.

As a method for writing whole information on the optical memory medium at one time, recording can be performed by bringing a metal mask made by means of photolithography on a surface of a quartz substrate into tight contact with the optical memory medium and by directing light to the rear surface of the quartz substrate. This method is effective for writing tracks for determining bit addresses and for making a large number of copies of the information recorded thereon.

As a method for moving the optical memory medium in the horizontal direction, a mechanism for rotating the optical memory medium may be provided in the coarse adjustment mechanism to perform optical recording in the form of rings or spiral in addition to a method of moving the medium in the X- and Y-directions to perform recording in the form of squares.

The optical memory medium and the recording and read apparatuses using this optical memory medium made it possible to record and reproduce information with high density.

What is claimed is:

1. An optical memory medium comprising: a piezoelectric substrate modified by an optically reactive functional group formed on a surface thereof.

2. An optical memory medium according to claim 1; wherein the piezoelectric substrate comprises an AT cut quartz plate.

3. An optical memory medium according to claim 1; wherein the optically reactive functional group is selected from the group consisting of photolytic reaction species, photooxidation species, photoreduction species, cis-trans photoisomerization species, and photochromic reaction species.

4. An optical memory medium according to claim 1; wherein the piezoelectric substrate comprises a shear-vibration mode piezoelectric substrate.

5. An optical memory medium according to claim 1; wherein the optically reactive functional group is selected from the group consisting of photolytic reaction species, photooxidation species, photoreduction species, cis-trans photoisomerization species, and photochromic reaction species.

6. An optical memory medium according to claim 1; wherein the optically reactive functional group comprises a photolytic functional group.

7. An optical memory medium according to claim 1; wherein the optically reactive functional group comprises a photooxidation/photoreduction functional group.

8. An optical memory medium according to claim 1; wherein the optically reactive functional group comprises a cis-trans photoisomerization functional group.

9. An optical memory medium according to claim 1; wherein the optically reactive functional group comprises a photochromic functional group.

10. An optical memory medium comprising: a piezoelectric substrate having a main surface, an electrode disposed on the main surface, and an optically reactive functional group formed over the electrode for storing information.

11. An optical memory medium according to claim 10; wherein the optically reactive functional group is selected from the group consisting of photolytic reaction species, photooxidation species, photoreduction species, cis-trans photoisomerization species, and photochromic reaction species.

12. An optical memory medium according to claim 10; wherein the piezoelectric substrate comprises an AT cut quartz plate.

13. An optical memory medium according to claim 10; wherein the piezoelectric substrate comprises a shear-vibration mode piezoelectric substrate.

14. An optical memory medium comprising: a silicon substrate having a 4-(chloromethyl) phenyl trimethoxy silane film formed on a surface thereof for recording information.

15. An optical memory medium according to claim 14; further comprising an electrode disposed between the surface of the silicon substrate and the 4-(chloromethyl) phenyl trimethoxy silane film.

* * * * *